United States Patent
Vetro et al.

(10) Patent No.: US 7,349,472 B2
(45) Date of Patent: Mar. 25, 2008

(54) RATE-DISTORTION MODELS FOR ERROR RESILIENT VIDEO TRANSCODING

(75) Inventors: Anthony Vetro, Cambridge, MA (US); Minghui Xia, Plainsboro, NJ (US); Bede Liu, Princeton, NJ (US); Huifang Sun, Billerica, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 819 days.

(21) Appl. No.: 10/776,062

(22) Filed: Feb. 11, 2004

(65) Prior Publication Data

US 2005/0175090 A1 Aug. 11, 2005

(51) Int. Cl.
H04B 1/66 (2006.01)
H04N 7/12 (2006.01)
H04N 11/02 (2006.01)

(52) U.S. Cl. .................. 375/240.03; 375/240.27; 375/240.28

(58) Field of Classification Search .......... 375/240.03, 375/240.27, 240.28
See application file for complete search history.

(56) References Cited

U.S. PATENT DOCUMENTS 6,339,450 B1 * 1/2002 Chang et al. .............. 348/470

OTHER PUBLICATIONS

Cote, et al., "Optimal mode selection and synchronization for robust video communications over error-prone networks," IEEE Journal on Selected Areas in Communications, vol. 18, No. 6, pp. 952-965, 2000.
Dogan, "Error-resilient video transcoding for robust inter-network communications using GPRS," IEEE Transactions on Circuits and Systems for Video Technology, vol. 12, No. 6, pp. 453-464, 2002.
Zhang, et al., "Video coding with optimal inter/intra-mode switching for packet loss resilience," IEEE Journal on Selected Areas in Communications, vol. 18, No. 6, pp. 966-976, 2000.
Bertsekas, "Projected Newton methods for optimization problems with simple constraints," Tech. Rep. LIDS R-1025, MIT, Cambridge, MA, 1980.
Reyes, et al. "Error-resilient transcoding for video over wireless channels," IEEE Journal on Selected Areas in Communications, vol. 18, No. 6, pp. 1063-1074, 2000.
Reibman et al., "Low-complexity quality monitoring of MPEG-2 video in a network," in Proceedings IEEE International Conference on Image Processing, Sep. 2003.

* cited by examiner

Primary Examiner—Marsha D. Banks-Harold
Assistant Examiner—Chikaodili E Anyikire
(74) Attorney, Agent, or Firm—Dirk Brinkman; Clifton D. Mueller; Gene V. Vinokur (57) ABSTRACT

A model stored in a memory accessible by a video transcoder includes a first rate-distortion function modeling a requantization of an input video. A second-rate distortion function models a resynchronization marker insertion rate for the transcoded video, and a third rate-distortion function models an intra-block insertion rate for the transcoded video.

9 Claims, 7 Drawing Sheets

RATE-DISTORTION MODELS FOR ERROR RESILIENT VIDEO TRANSCODING

FIELD OF THE INVENTION

This invention relates generally to transcoding videos, and more particularly to rate and distortion models for allocation of bits used to code the video source and bits that are applied for error resilience.

BACKGROUND OF THE INVENTION

Transmitting a video bitstream through wireless channels is a challenging problem due to limitations in bandwidth and a noisy channel. If a video is originally coded at a bit rate greater than an available bandwidth in a wireless channel, then the videos must first be transcoded to a lower bit rate, prior to transmission. Because a noisy channel can easily corrupt a quality of the video, there is also a need to make the encoded video bitstream resilient to transmission errors, even though the overall number of bits allocated to the bitstream is reduced.

Two primary methods used for error-resilience video encoding are resynchronization marker insertion and intra-block insertion (intra-refresh). Both methods are effective at localizing errors. If the errors are localized, then recovery from errors is facilitated.

Resynchronization inserts periodic markers so that when an error occurs, decoding can be restarted at a point where the last resynchronization marker was inserted. In this way, errors are spatially localized. There are two basic approaches for inserting synchronization markers: a group-of-block (GOB) based approach, which is adopted in the H.261/H.263 standard, and a packet-based approach, which is adopted in the MPEG-4 standard.

In the GOB-based approach, a GOB header is inserted periodically after a certain number of macroblocks (MBs). In the packet-based approach, header information is placed at the start of each packet. Because the way the packets are formed is based on the number of bits, the packet-based approach is generally more uniform than the GOB-based approach.

While resynchronization marker insertion is suitable to provide a spatial localization of errors, the insertion of intra MBs is used to provide a temporal localization of errors by decreasing the temporal dependency in the encoded video bitstream.

A number of error resilience video encoding methods are known. In "Error-resilient transcoding for video over wireless channels," IEEE Journal on Selected Areas in Communications," vol. 18, no. 6, pp. 1063-1074, 2000 by Reyes, et al., optimal bit allocation between error resilience insertion and video encoding is achieved by modeling the rate-distortion of error propagation due to channel errors. However, that method assumes that the actual rate-distortion characteristics of the video are known, which makes the optimization difficult to realize practically. Also, that method does not consider the impact of error concealment.

In "Optimal mode selection and synchronization for robust video communications over error-prone networks," IEEE Journal on Selected Areas in Communications, vol. 18, no. 6, pp. 952-965, 2000 by Cote, et al., the optimal error resilience insertion problem is divided into two sub-problems: optimal mode selection for MBs; and optimal resynchronization marker insertion. That optimization is conducted on an MB basis and inter-frame dependency is not considered.

Another method described by Zhang, et al., "Video coding with optimal inter/intra-mode switching for packet loss resilience," IEEE Journal on Selected Areas in Communications, vol. 18, no. 6, pp. 966-976, 2000, determines recursively a total decoder distortion with pixel-level precision to account for spatial and temporal error propagation in a packet loss environment. That method attempts to select an optimal MB encoding mode. That method is quite accurate on the MB level when compared with other methods. However, that method does not consider the inter-frame dependency and the optimization is only conducted on the current MB.

Dogan, et al. describe a video transcoding framework for general packet radio service (GPRS) in "Error-resilient video transcoding for robust inter-network communications using GPRS," IEEE Transactions on Circuits and Systems for Video Technology, vol. 12, no. 6, pp. 453-464, 2002. However, the bit allocation between inserted error resilience and the video encoding is not optimized in that method.

For video distortion caused by channel errors, a low complexity video quality model has been described by Reibman et al., in "Low-complexity quality monitoring of MPEG-2 video in a network," in Proceedings IEEE International Conference on Image Processing, September 2003. However, the measurement to determine error propagation effects is only based on the received bitstream. One of the most important aspects that is not fully considered by that method is the issue of inter-frame dependency, which is a key factor in motion compensated video encoding. Often, bit allocation and encoding mode selection are optimized only for the current MB or the current frame.

It is desired to provide an optimal solution that reduces the video bit rate while maintaining error resilience. It is also desirable to have models that account for inter-frame dependency, which is inherit to many coding schemes, and also accurately account for the propagation of errors at the receiver. This is especially important when a video bit stream is transferred from a channel with a high bandwidth and a low bit-error-rate (BER), for example, a wired channel, to a channel with a low bandwidth and a high BER, for example, a wireless channel. For such a low bandwidth channel, the combined task of bit rate reduction and error resilience insertion is essential because the bit rate reduction needs to be balanced against the additional error resilience bits.

SUMMARY OF THE INVENTION

The invention provides accurate rate-distortion (R-D) models for transcoding videos. One model describes the rate-distortion characteristics for requantizating a video considering inter-frame dependencies. Other models estimate the distortion relationship for error propagation in a motion compensated video and characterizes the rate for intra-block and resynchronization marker insertion. These models are used for optimal bit allocation schemes for video transcoding.

DETAILED DESCRIPTION OF THE PREFERRED EMBODIMENT

Figure 1:
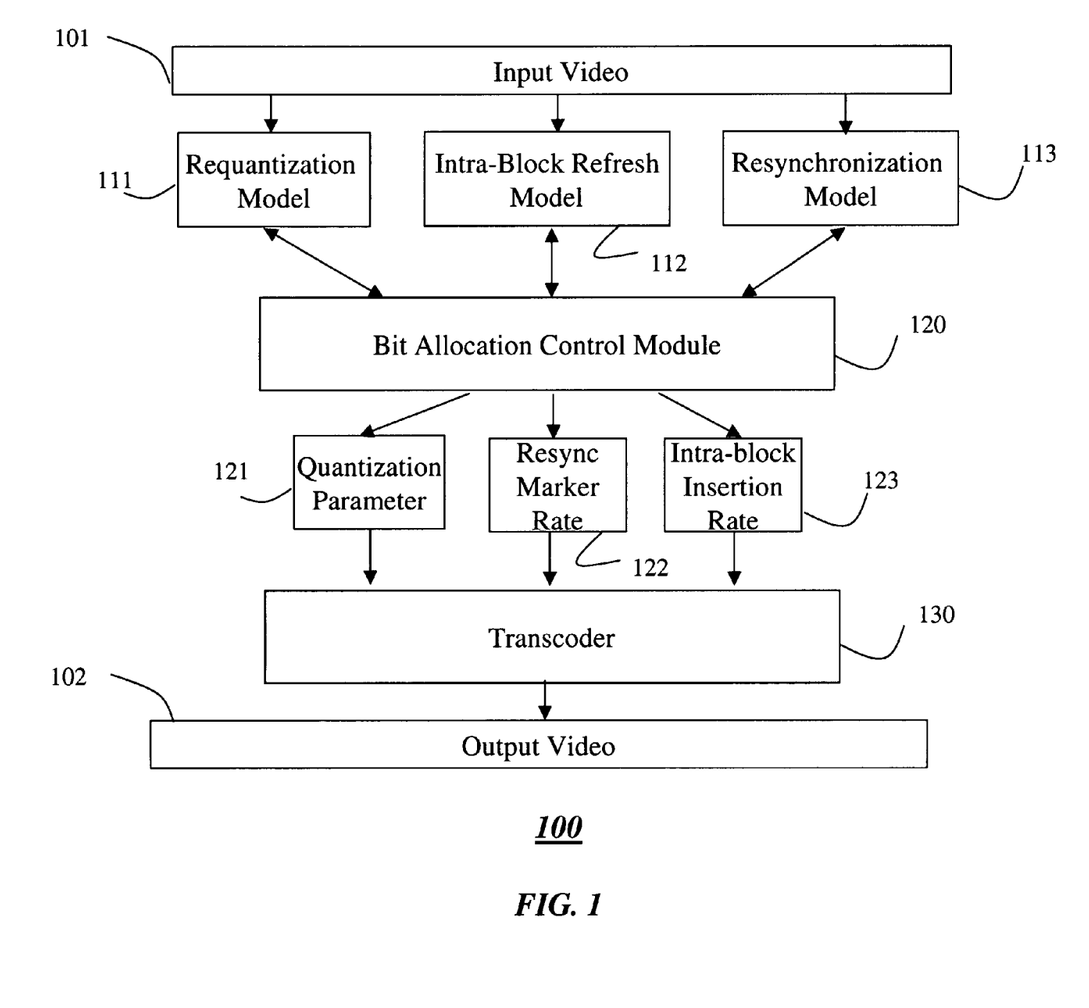
FIG. 1 is a block diagram of rate-distortion models and a transcoding method according to the invention.

As shown in FIG. 1, the invention provides a method for transcoding 100 an input video bitstream 101 so that a bit rate in an output bitstream 102 is reduced while maintaining error resilience under a given bit rate constraint and channel condition. The method 100 subjects to input video to three rate-distortion (RD) models: a video source requantization model 111, an intra-block refresh model 112, and a resynchronization marker model 113. The outputs of the three models are input to a bit allocation control module 120, which determines a quantization parameter 121, a resynchronization marker rate 122 and an intra-block refresh rate 123. These parameters are used by a transcoder 130 to form the output bitstream 102.

The three models are novel in that inter-frame dependency is included in both a video source model and an error resilience model. In addition, the error resilience model in the transcoding considers error concealment at the receiver.

The invention also provides an alternative embodiment of the transcoding method that achieves near-optimal performance at a lower complexity.

Transcoder Structure

Figure 2:
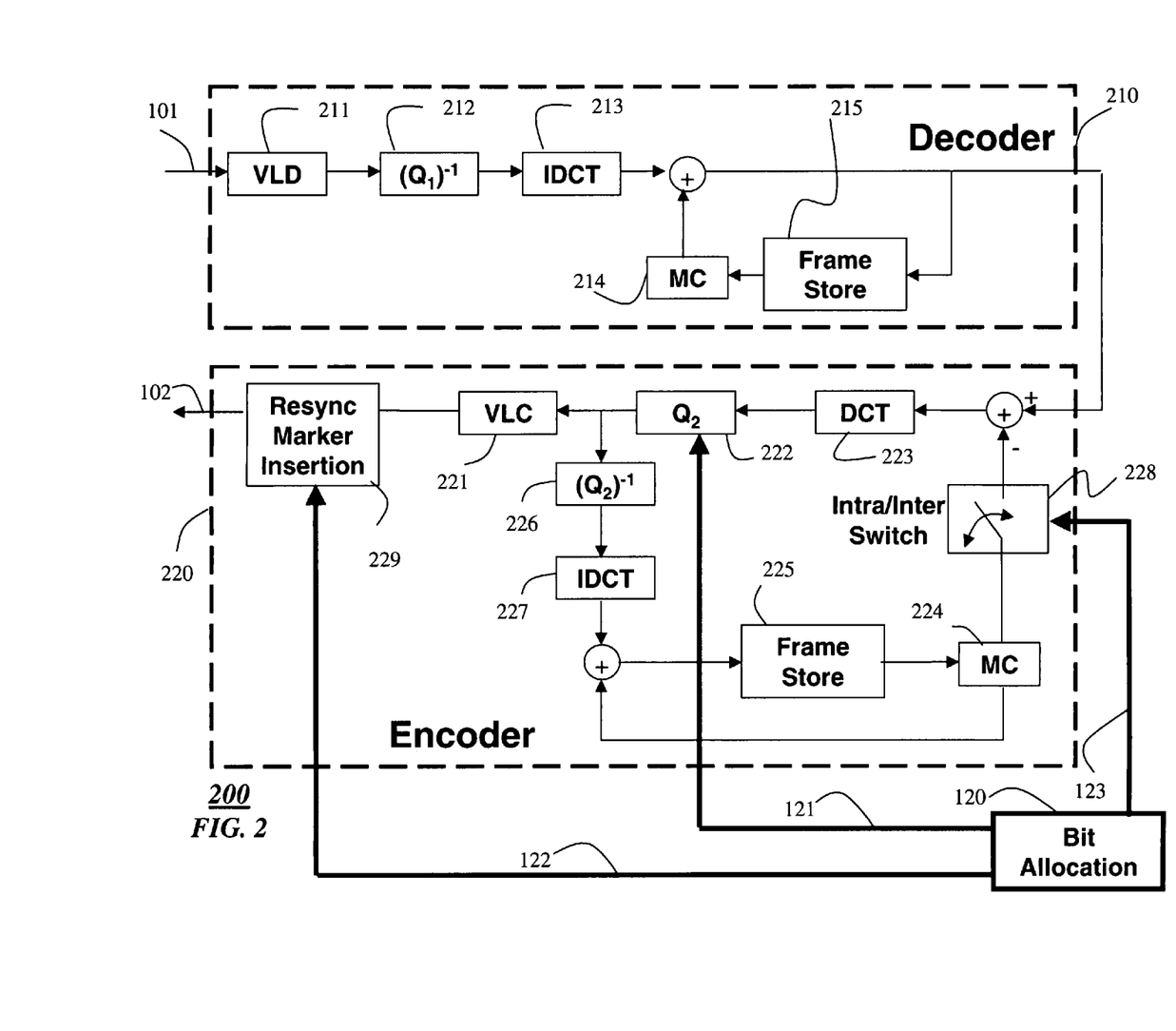
FIG. 2 is a block diagram of a video transcoder according to the invention.

FIG. 2 shows a transcoder 200 according to the invention. The transcoder includes a decoder 210 and an encoder 220. The decoder 210 takes an input video bitstream 101 at a first bit rate. The encoder produces an output bitstream 102 at a second bit rate. In a typical application, the second bit rate is less than the first bit rate.

The decoder 210 includes a variable length decoder (VLD) 211, a first inverse quantizer ($Q^{-1}_1$) 212, an inverse discrete cosine transform (IDCT) 213, a motion compensation (MC) block 214, and a first frame store 215.

The encoder 220 includes a variable length coder (VLC) 221, a quantizer ($Q_2$) 222, a discrete cosine transform 223, a motion compensation (MC) block 224, and a second frame store 225. The transcoder also includes a second inverse quantizer ($Q^{-1}_2$) 226 and a second IDCT 227.

In addition, the encoder includes an intra/inter switch 228 and a resynchronization marker insertion block 229.

The bit allocation 120 of FIG. 1 provides the quantization parameter 121 to the quantizer 222, the resynchronization marker rate 122 to the resynchronization marker insertion block 229 and the intra-block refresh rate 123 to the intra/inter switch 228.

Problem Statement

It is an object of the invention to minimize an end-to-end distortion of the encoded video bitstream subject to rate constraints. An overall rate budget is allocated among the three different components that contribute to the rate, i.e., video source requantization, resynchronization marker insertion, and intra-refresh.

To achieve this object the three distinct components, the video source requantization model, the intra-refresh model, and the resynchronization marker insertion model are described. The later two model error-resilience. Although there is some degree of dependency among these three components, each component has a unique impact on the R-D characteristics of the transcoded video under different channel conditions.

The video source model accounts for the R-D characteristics of the video bitstream without resynchronization markers or intra-refresh insertion, while the error-resilience models accounts for the R-D characteristics of intra-block insertion and resynchronization marker insertion.

Although the separation of the error resilience model from the video source model is an approximation, it turns out to be quite accurate for the R-D optimized bit allocation scheme according to the invention.

The problem is formally stated as follows. A target bit rate constraint is $R_T$. A total distortion is D, which is measured as a mean squared error (MSE). Given these parameters, it is desired to minimize the distortion, subject to the target rate constraint, i.e., to solve $$\min D = \sum_{k=1}^{K} d_k(\omega_k) \qquad (1)$$

$$\text{subject to } \sum_{k=1}^{K} r_k(\omega_k) \le R_T,$$

where $d_k$ is the distortion caused by each of the three components $k \in K$ for $k=1, 2, 3$, $r_k$ is the rate of each component and $\omega_k$ are the specific parameters used in the allocation, e.g., quantization parameters, resynchronization marker spacing, and intra refresh rate.

One way to solve the above problem is through a Lagrangian optimization approach in which the following quantity is minimized:

$$\sum_{k=1}^{K} d_k(\omega_k) + \lambda \sum_{k=1}^{K} r_k(\omega_k), \qquad (2)$$

where $\lambda$ is the Lagrangian multiplier to be determined during the optimization. A bisection process can be used to obtain the optimal multiplier used to solve this problem. However, that process is iterative and computationally expensive. Also, obtaining accurate R-D sample points required by the optimization procedure is still an open issue.

It is preferred to use a distinct R-D model for each of the three components so that the optimization does not have to obtain the actual R-D values from simulation. With these models, some of the computational burden for solving the above problem is alleviated. However, this solution is relatively complex. Therefore, an alternative method that can solve the bit allocation problem with similar performance, but with a much lower complexity, is sought and described as part of this invention.

Video Source Requantization Model

Our R-D model for a coded video source operates on groups-of-frames (GOP). This accounts for inter-frame dependency by considering the requantization distortion in the current frame that propagates to the next frame through motion compensation. The R-D model is then modified accordingly for the next frame to account for this error propagation effect.

If a composite signal, such as the output video 102 is decomposed into independent components, i.e., the requantized video, the resynchronization markers, and the intra-refresh blocks, then a composite R-D model can be derived directly from the three individual R-D models. Furthermore, if the signal can be decomposed into independent identically distributed (i.i.d.) Gaussian sources with energy compact transforms, such as the DCT, then the total distortion D of the signal caused by the encoding can be modeled as:

$$D = \left[\prod_{i=0}^{L-1} \Phi(\omega_i)\right]^{\frac{1}{L}} \cdot e^{-\beta \cdot R(D)}, \qquad (3)$$

where L is the total number of frequency coefficients in the case of DCT, $\Phi(\omega_i)$ is the power spectrum density function of coefficient i, R is the bit rate of the signal, and a constant parameter $\beta$ is 2ln2. An interesting observation from this result is that the exponential function of rate is proportional to the product of the coefficient variances rather than the sum of variances.

The above model is only accurate for Gaussian sources with fine quantization. It is known that a video source can be characterized more accurately by a generalized Gaussian model. Furthermore, a video source often needs to go through coarse requantization during transcoding to adapt to lower bandwidth constraints.

The following modifications are made to the model to accommodate these two issues. First, the parameter $\beta$ is made variable, rather than a fixed value, and second, R(D) is replaced by $R^\gamma(D)$.

Furthermore, if the value $$\left[\prod_{i=0}^{L-1} \Phi(\omega_i)\right]^{\frac{1}{L}}$$

is replaced by $\sigma^2$, the total variance of the signal, then $$D = \sigma^2 e^{-\beta R^\gamma(D)}. \qquad (4)$$

Experimental data indicate that $\beta$ is usually in the range of [1, 10], and $\gamma$ is in the range of [0, 1]. Then, for requantizing intra-coded frames, the distortion is $$D_0 = \sigma_0^2 e^{-\beta_0 R_0^{\gamma_0}}, \qquad (5)$$

where $D_0$ is the distortion of the intra-coded frame caused by requantization, and $R_0$ is the rate. The intra-coded variance, $\sigma_0^2$, can be estimated in the frequency domain.

It is possible to estimate the model parameters $\beta$ and $\gamma$ from two sample points on the R-D curve, as described herein.

Without considering inter-frame dependency, a similar model can be used for inter-coded frames:

$$D_k = \sigma_k^2 e^{-\beta_k R_k^\gamma}, \ k=1, 2, \ldots, N-1, \qquad (6)$$

where N is the total number of frames in a GOP, $D_k$ is the distortion of the inter-coded frame caused by requantization, $R_k$ is the rate and $\sigma_k^2$ is the variance of the input signal. Again, the model parameters $\beta$ and $\gamma$ can be estimated from two sample points on the R-D curve.

The inter-frame dependency is modeled by changing the frame variance $\sigma_k^2$ to $\sigma_k^{*2}$ $$D_k = \sigma_k^{*2} e^{-\beta_k R_k^\gamma} = (\sigma_k^2 + \alpha_k D_{k-1}) e^{-\beta_k R_k^\gamma}, \ k=1, 2, \ldots, N-1, \qquad (7)$$

where $\sigma_k^{*2} = \sigma_k^2 + \alpha_k D_{k-1}$ denotes the inter-frame variance, and $D_{k-1}$ denotes an extra quantization residue error produced when the previous frame is requantized with a larger Q-scale, and $\alpha_k$ denotes a propagation ratio, which is determined by the amount of motion compensation. The term $\alpha_k D_{k-1}$ models the dependency between the current and the previous frame. This term captures the quantization error propagation effect caused by motion compensation. That is, when the previous frame is quantized coarsely, more quantization error propagates to the current frame through motion compensation.

Model Parameter Estimation

Parameter estimation for the proposed R-D models is performed in two stages on a GOP-basis. In the first stage, all the frames in the GOP are requantized with multiple sample quantization scales, e.g., 4, 8, 31. For the P-frames, no motion compensation is performed. Using the three sample R-D points, the three parameters $\sigma_0^2$, $\beta_0$, and $\gamma_0$ are determined from Equation (5) that establish the model for I-frame. Similarly, the parameters $\sigma_k^2$, $\beta_K$, and $\gamma_k$ are estimated from Equation (6) that establish the model for P-frame without taking the propagation effect into account, i.e., the $\sigma_k^2$ that is estimated here denotes the variance of the input signal.

The second stage takes care of propagation effects in the model parameter estimates for the P-frames by determining $\alpha_k$. To do this, first requantize the I-frame at a different quantization scale than used in the first stage, e.g., $Q_f=14$. Second, requantize the P-frames at a different quantization scale while performing motion compensation to account for the propagation effects. With one sample point in a P-frame, the parameter $\alpha_k^{*2}$ can be estimated from Equation (7). Then, from Equation (7), where $\sigma_k^{*2} = \sigma_k^2 + \alpha_k D_{k-1}$, determine $\alpha_k$ by:

$$\alpha_k = \frac{\sigma_k^{*2} - \sigma_k^2}{D_{k-1}}, \qquad (8)$$

where $D_{k-1}$ is the distortion of the previous frame.

The parameters $\gamma_k$ and $\alpha_k$ are relatively constant within a given sequence. Therefore, it is sufficient to estimate these parameters only once at the start of a sequence, or if a scene change is detected. For parameters that are more sensitive to the scene content, e.g., $\sigma_k$ and $\beta_k$, their values are updated for each frame. The advantage of this simplification is that after $\gamma_k$ and $\alpha_k$ are estimated at the start, the transcoding only needs to be performed once to determine the model parameters, instead of twice. The parameter $\{\sigma_k^2\}$ is estimated from the variance of the DCT coefficients as expressed in Equation (4), and $\{\beta_k\}$ is estimated from one R-D sample point, which is easily obtained by requantizing the current frame.

Error-Resilience R-D Models

This section describes the second and third rate-distortion models that improve error-resilience, i.e., resynchronization marker insertion and intra-block refresh. First, a transmission environment is described, including the system structure, type of channel, and methods of error concealment. Then, the distortion models for resynchronization and intra-block insertion (intra-refresh) are described. Here, the focus is on the distortion models, because the rate estimates are obtained in a rather straightforward manner. Specifically, the rate consumed by resynchronization markers can be determined from the number of bits in the resynchronization header and the resynchronization marker spacing, while the rate consumed by intra-refresh can be determined from the intra-refresh rate and the average rate increase by replacing an inter-coded MB with an intra-coded MB.

System Structure

Figure 3:
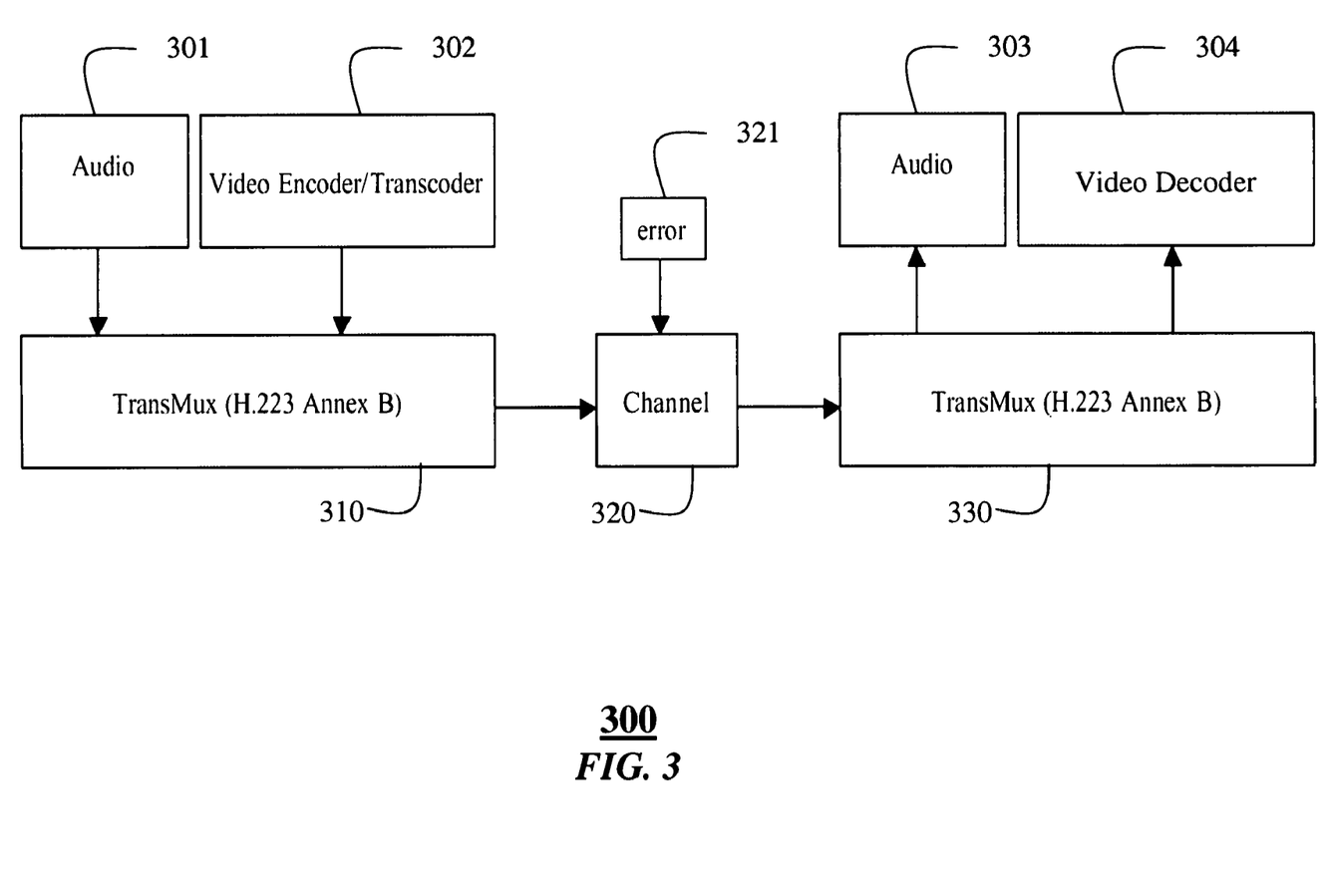
FIG. 3 is a block diagram of a video system according to the invention.

FIG. 3 shows a system 300 for transmitting and receiving a video bitstream via a noisy channel. Audio data 301 is generated and multiplexed with encoded video data 302. The data are transmitted 310 according to the H.324M standard defined for a typical mobile terminal, and an AL3 TransMux defined in Annex B of the H.223 standard. A 16-bit and an 8-bit cyclic redundancy code (CRC) are used for error detection in the video and audio payloads, respectively. For video packetization, a packet structure described in the MPEG-4 resilience tool is used. This structure provides resynchronization at approximately the same number of bits. In this way, a typical video packet has seven bytes overhead in total, including two bytes for control, three bytes for header, and two bytes for the CRC checksum. A maximum video packet payload length is 254 bytes.

A wireless channel 320 is represented according to a binary symmetric channel (BSC) model, which assumes independent bit error 321 in a bitstream. For error detection, recovery and concealment in the video receiver 330, it is assumed that after an error is detected, either by a CRC checksum or by a video syntax check, the entire video packet containing the error is discarded, and the lost MBs are concealed. This is done to avoid disturbing visual effects caused by decoding erroneous packets. The receiver recovers the audio signal 303 and the video signal using a video decoder 304.

Other errors that can be detected include illegal VLC, semantic error, excessive DCT coefficients ($\geq 64$) in a MB, and inconsistent resynchronization header information, e.g., QP out of range, MBA(k)<MBA(k−1), etc. The error is recovered by resynchronizing to the added packet resynchronization markers or to the frame headers.

For error concealment, both spatial and temporal error concealment methods are employed, using a simple block replacement scheme.

Figure 4:
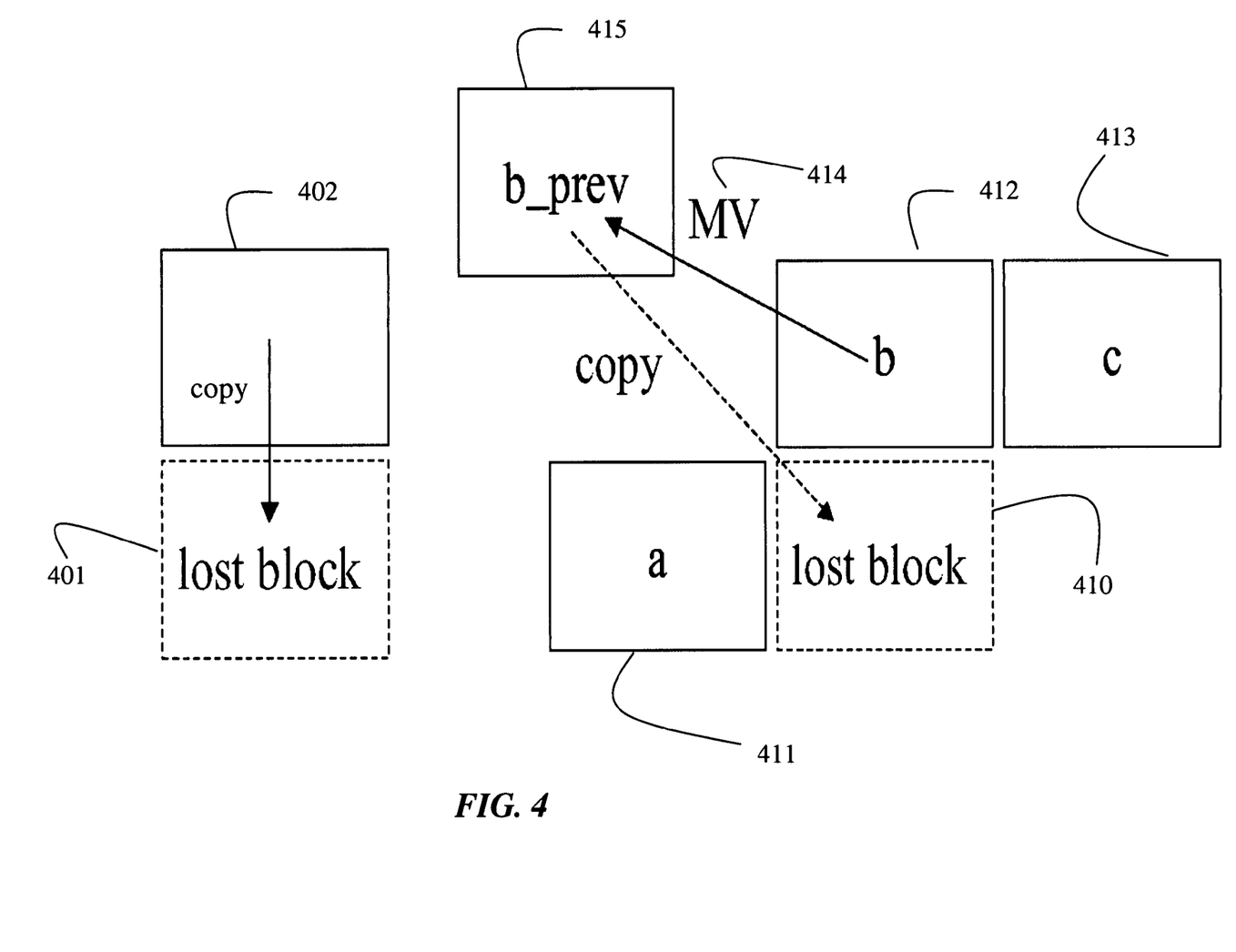
FIG. 4 is a block diagram of a spatial concealment method used by the invention.

As shown in FIG. 4, a spatial concealment method is employed for a lost MB 401 in an intra-coded frame. The concealment is performed by copying the MB from its immediate upper neighbor 402.

Similarly, temporal concealment is employed for a lost MB 410 in an inter-coded frame. Here, the motion vector 414 of the lost MB 410 is set to be the median of the motion vectors selected from three specific neighbors, i.e., blocks labeled a 411, b 412, and c 413 as shown in FIG. 4. The MB in the previous frame 415 that this motion vector is referencing is copied to the current location to recover the lost block 410.

It is noted that the error-resilience models described in this invention also apply to other prior art error concealment schemes as well.

Overall Distortion from Channel Error

Figure 5:
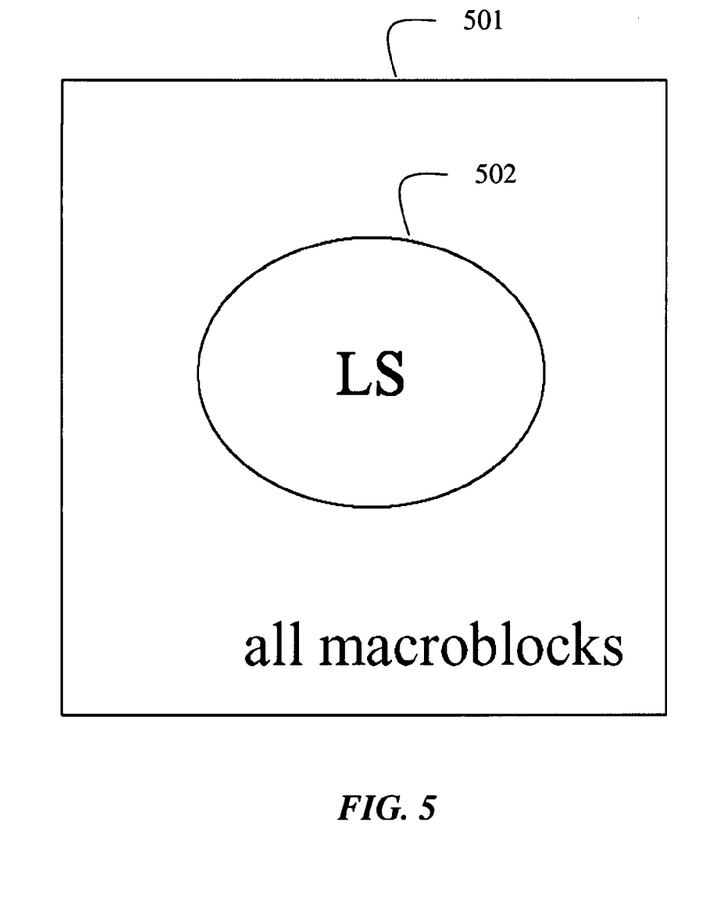
FIGS. 5 and 6 are block diagrams of decomposing distortion for I- and P-frames of a video caused by channel errors.
Figure 6:
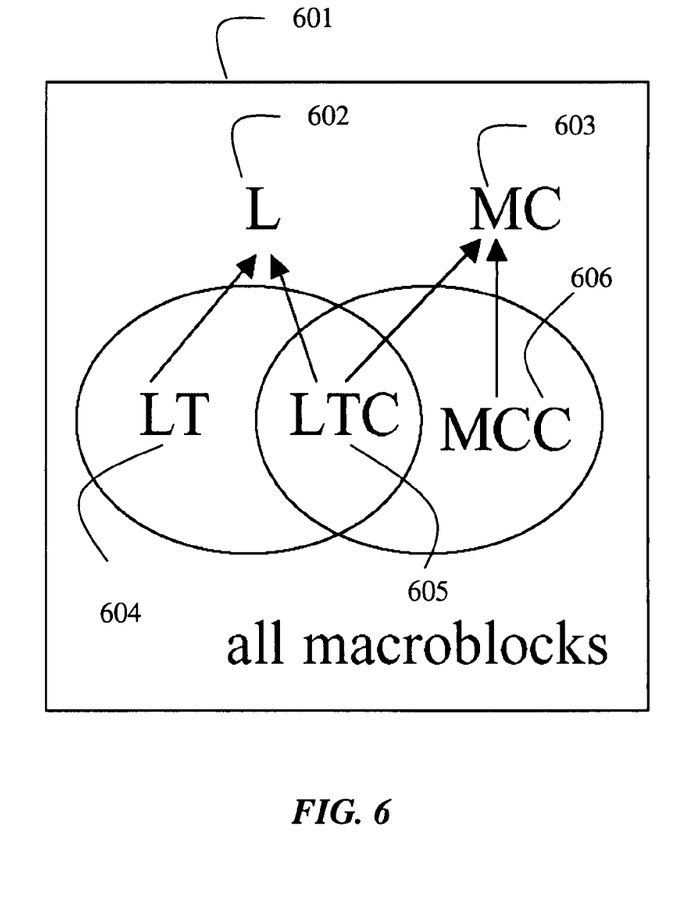

FIGS. 5 and 6 show the decomposition of the overall distortion for I- and P-frames caused by channel errors. A rectangle 501 denotes the set of all the MBs in an I-frame, while a rectangle 601 denotes the set of all MBs in a P-frame.

For I-frames, distortion comes from lost intra-coded MBs (LS) 502, which are spatially concealed. For P-frames, distortion comes from two parts: distortion from lost MBs (L) 602, and distortion propagated from previous corrupted MBs through motion compensation, which are referred to as MC MBs 603. The lost MBs can be further decomposed into two categories: inter-coded MBs (LT) 604 lost and concealed with temporal concealment, and inter-coded MBs (LTC) 605 lost and concealed with temporal concealment, but the replacement themselves were corrupted. Note that LTC MBs define the intersection of L MBs and MC MBs. The MCC MBs 606 refer to the MBs that are received correctly, but reference the previous corrupted MBs through motion compensation.

If the number of MBs lost in a frame is $Y_l$, the number of MBs corrupted through motion compensation is $Y_{mc}$, and the total number of MBs in a frame is M, then the average number of corrupted MBs in a frame E[Y] can be expressed as:

$$E[Y]=E[Y_l]+E[Y_{mc}]-E[Y_{ltc}], \qquad (9)$$

where $Y_{ltc}=Y_l \cap Y_{mc}$. This intersection is proportional to the number of lost MBs and the number of inter-coded MBs corrupted through motion compensation, and subsequently, $$E[Y_{ltc}] = E[Y_l \cap Y_{mc}] \approx \frac{E[Y_l] \cdot E[Y_{mc}]}{M}, \qquad (10)$$

and the total average distortion, measured in MSE, can therefore calculated by:

$$D = \qquad (11)$$

$$\begin{cases} \frac{1}{M}\{E[Y_l]\cdot D_s\} & \text{for I-frame} \\ \frac{1}{M}\{E[Y_{lt}]\cdot D_t + E[Y_{ltc}]\cdot D_{tc} + E[Y_{mcc}]\cdot D_{mc}\} & \text{for P-frame.} \end{cases}$$

where $D_s$ is the average spatial concealment distortion, $D_t$ is the average temporal concealment distortion when copying a correct MB from the previous frame, $D_{tc}$ is the average temporal concealment distortion when copying a corrupted MB from the previous frame, and $D_{mc}$ is the average distortion of correctly received MBs referencing corrupted MBs through motion compensation. The number of MCC MBs is $Y_{mcc}$ as shown in FIG. 5.

Techniques to determine each quantity in the above equation are described below. There are two categories of quantities: distortion related to concealing lost MBs, and distortion related to error propagation as a result of motion compensation.

Error Concealment Distortion

The probability $p_l$ that one MB is lost in a video frame n can be modeled by the probability $p_{sl}$ that a video packet is lost. If the channel bit error rate (BER) is $P_e$, and an average video packet length in bits is $L_s$, then $$p_l=p_{sl}=1-(1-P_e)L_s. \qquad (12)$$

It follows that the average number of lost MBs E[$Y_l$(n)] in frame n is $p_l \cdot M$. The distortion caused by losing one MB can be calculated according to one of the three situations:

the loss of an intra-coded MB that is spatially concealed resulting in distortion $D_s$, the loss of an inter-coded MB that is temporally concealed by copying a non-corrupted MB from the previous frame resulting in distortion $D_t$, and the loss of an inter-coded MB that is temporally concealed by copying a corrupted MB from the previous frame resulting in distortion $D_{tc}$ The values $D_s$ and $D_t$ can be estimated by calculating pixel differences between the lost MB and the replacement MB.

The value $D_{tc}$ can be approximated by an addition of motion compensation corruption to $D_t$, e.g., $D_{tc}=D_t+D_{mc}$.

Error Propagation Distortion

A Markov model can be used to estimate error propagation by motion compensation. The reason for using the Markov model is because the number of corrupted MBs in the current frame through motion compensation only depends on the motion vectors in the current frame and the number of corrupted MBs in the previous frame. The probability that a single MB is corrupted through motion compensation can be determined by:

$$p_{mc}=\rho\theta_1+[1-(1-\rho)^2]\theta_2+[1-(1-\rho)^4]\theta_3, \quad (13)$$

where $\rho$ is the probability of one MB being corrupted in the previous frame, $\theta_1$ denotes the proportion of MBs in the current frame that reference a single MB, $\theta_2$ denotes the proportion of MBs that reference two MBs, and $\theta_3$ denotes the proportion of MBs that reference four MBs in the previous frame. If the proportion of intra-coded MBs is denoted $\eta$, then $\theta_1+\theta_2+\theta_3+\eta=1$. From this relation, it is clear that a higher value of $\eta$ yields a lower value of $p_{mc}$.

Then, a probability transition matrix that characterizes the error propagation through motion compensation can be calculated by:

$$P(i, j_{mc}) = P\{Y_{mc}(n) = j_{mc} \mid Y(n-1) = i\} = \binom{M}{j_{mc}} p_{mc}^{j_{mc}} (1-p_{mc})^{N-j_{mc}}, i, j_{mc} = 0, \ldots, M. \quad (14)$$

where $j_{mc}$ is the number of MBs corrupted through motion compensation in frame n, i is the total number of MBs corrupted in frame n−1. An n-step probability transition matrix $P^n$ is:

$$P^n = \prod_{k=1}^{n} P_k, \quad (15)$$

where $$P^n(i,j_{mc})=P\{Y_{mc}(n)=j_{mc}|Y(0)=i\}. \quad (16)$$

$P^k$ is the 1-step Markov transition matrix for frame k. The average number of corrupted MBs through motion compensation in frame n can be obtained by $$P^n(i,j_{mc})=P\{Y_{mc}(n)=j_{mc}|Y(0)=i\}. \quad (17)$$

where $p_0(i)$ is the probability of i MBs being corrupted in the first frame.

The above model is computationally complex, and is therefore simplified using a 1-step Markov model instead of an n-step Markov model, and use $E[Y(n)]$ to replace i in Equation (14). Therefore, Equation (17) becomes $$E\{Y_{mc}\}=M\cdot p_{mc}. \quad (18)$$

It follows that the average distortion due to motion compensation at frame n can be expressed by $$D_{mc}(n)=\rho\cdot(1-\eta)\cdot D(n-1), \quad (19)$$

where D(n−1) is the average distortion of frame n−1.

Model Accuracy

Figure 7:
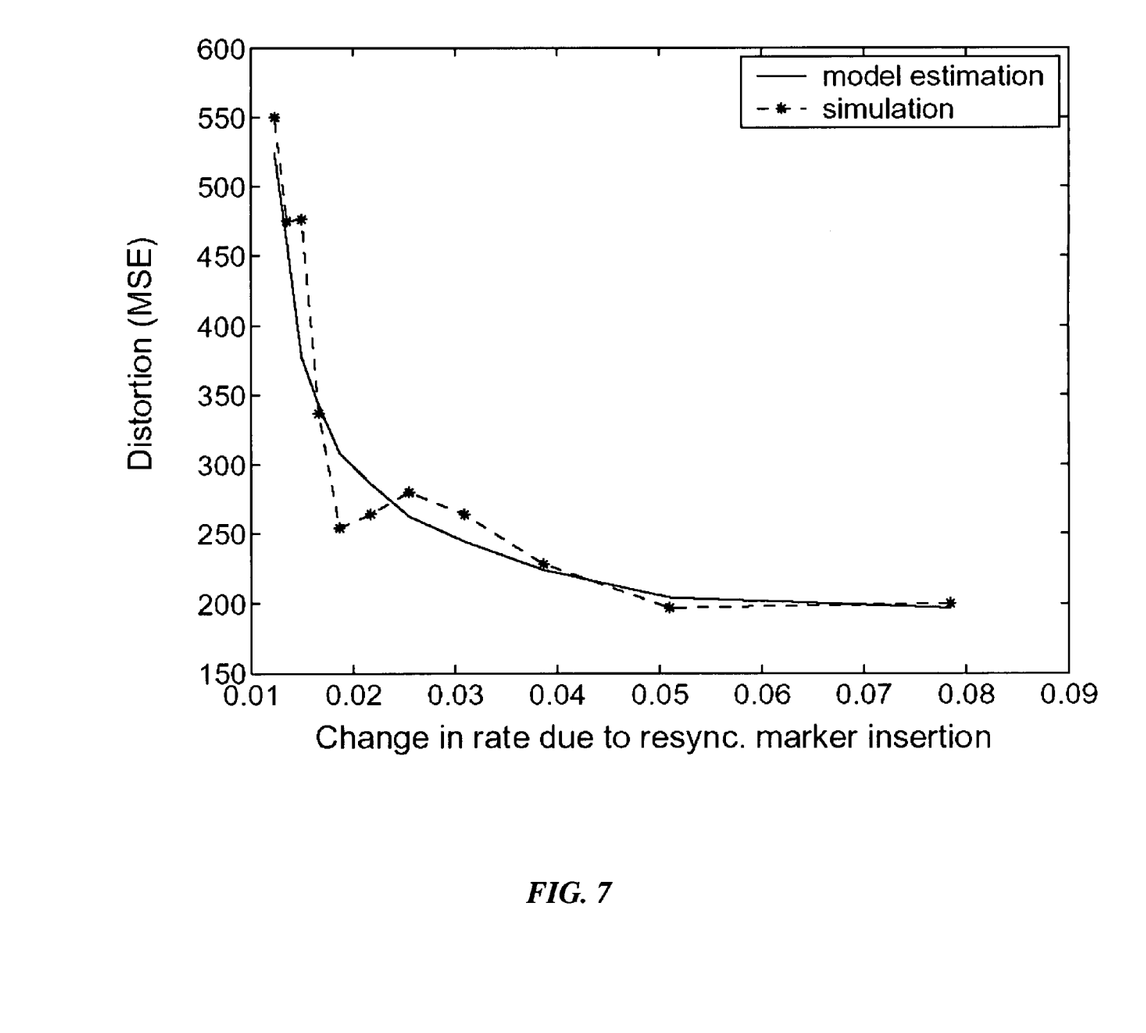
FIG. 7 is a graph comparing resynchronization marker insertion accuracy.

FIG. 7 compares the accuracy of the R-D model for resynchronization marker insertion as a function of marker spacing or video packet length. The rate change of inserted resynchronization markers comes from the change of marker spacing or packet length in a range of [130, 1300] bits. The test is performed with a channel BER=$10^{-4}$.

Figure 8:
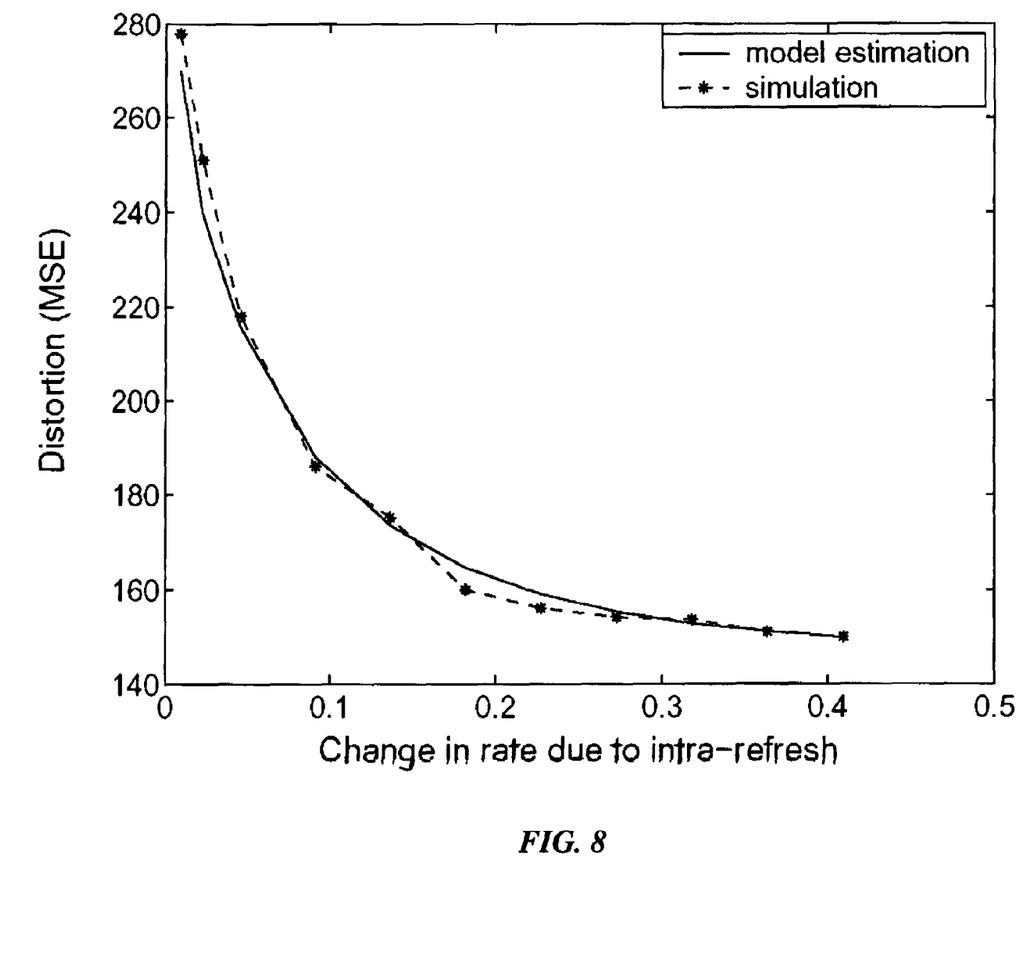
FIG. 8 is a graph comparing intra-block insertion accuracy.

FIG. 8 shows a test of the intra-refresh R-D model as a function of intra-refresh rate. The intra-refresh rate varies from 2% to 90%. From these figures, it can be seen that the error-resilience models according to the invention predict accurately the actual distortion.

Bit Allocation

Based on the above described R-D models for video source requantization, resynchronization marker insertion, and intra-refresh, it is now possible to solve the R-D optimized bit allocation problem. Then, the resulting optimal source R-D curve can be used in the overall bit allocation for error resilient coding. Based on the overall optimal bit allocation scheme, a sub-optimal scheme to enable transcoding with lower complexity, but achieving similar performance, is described.

Optimized Rate Allocation—Source Requantization Only

With the R-D model for video source requantization, optimal bit allocation 120 can be achieved for a given rate budget R. Specifically, a solution to the following problem is sought:

$$\min \sum_k D_k \quad (20)$$

$$\text{subject to } \sum_k R_k \leq R \text{ and } R_{kl} \leq R_k \leq R_{ku} \quad k = 0, 1, \ldots, N-1$$

where $R_{kl}$ and $R_{ku}$ are lower and upper bound of the achievable rate for the $k^{th}$ frame.

For an I-frame, $R_{kl}$ and $R_{ku}$ can be determined by the minimum and maximum allowable quantization scale. For a P-frame k, $R_{kl}$ is achieved by assigning a minimum quantization scale to all its previous frames (0 to k−1), and the maximum allowable quantization scale to the current frame. On the other hand, $R_{ku}$ is obtained by assigning a maximum allowable quantization scale to all its previous frames and the minimum quantization scale to the current frame. In practice, $R_{ku}$ can be estimated by coding all the MBs in the current frame with intra mode.

There are several known methods to solve the above optimization problem, e.g., a dynamic programming approach based on the Lagrange multiplier and a trellis. The problem with that approach is that as the number of frames increases, the trellis grows exponentially and the size of the problem quickly becomes intractable. Another issue is that the Lagrange multiplier needs to be determined by traversing the trellis tree iteratively, which further complicates the problem. An alternative approach incorporates a penalty function into the minimization problem. However, that iterative approach is relatively complex. Both approaches assume that the actual R-D values at various operating points are readily available, which may not be the case in practical applications.

The method according to the invention is based on a projected Newton method, see Bertsekas, "Projected Newton methods for optimization problems with simple constraints," Tech. Rep. LIDS R-1025, MIT, Cambridge, Mass., 1980, incorporated herein by reference.

In order to use that method, the problem in Equation (20) needs to be modified. First, an optimal minimum distortion occurs when $\Sigma_k R_k=R$, i.e., the optimal solution always uses the entire available bit budget. Second, it is practical to achieve a lower bit budget, most of the time. Therefore, the rate upper bound $R_{ku}$ is exceeded rarely. Thus, the upper bound can be eliminated. Given this, the new constrained problem is written as:

$$\min \sum_k D_k \qquad (21)$$

$$\text{subject to } \sum_k R_k^* = R^* \text{ and } R_k^* \geq 0 \; k = 0, 1, \ldots, N-1$$

where the lower bound $R_{kl}$ is eliminated by substituting $R_k$ with $R^*_k + R_{kl}$, where $R^* = R - P_k R_{kl}$.

One advantage of this method is that no additional parameters need to be introduced, such as a Lagrangian multiplier. The constraints are handled implicitly within the method by variable substitution and linear projection. Therefore, this method is comparable to its unconstrained counterpart. Another advantage of the method is that it uses Hessian information to improve the convergence. Therefore, the resulting Newton-like method has a typically superlinear rate of convergence and is considerably faster than prior art methods. With this method, the size of the problem can be increased considerably without increasing the computational time.

R-D Derivative Equalization

To provide a low-complexity implementation for the bit allocation, a technique to determine a suboptimal operating point is described. This technique is basically an R-D derivative equalization scheme. This scheme is based on the fact that optimal bit allocation is achieved at the point where the slopes of the R-D function for each component are equalized, i.e., made substantially the same.

Starting from an operation point close to an optimal point, the objective is to continually adjust the operating point in the direction of the optimal point. To achieve this, there are two steps:

start from an operational point close to the optimal point, and move towards an optimal point and remain at that point, given changes in video content and channel conditions.

The first step is not very difficult because the initial optimization only needs to be done with the first GOP. The second step uses the following R-D derivative equalization scheme. Specifically, examine a local derivative of each R-D curve and adjust the bits allocated to each component accordingly. If the rate budget is constant, then reallocating a change in rate $\Delta R$ from the component with a smallest absolute derivative value to the component with a largest absolute derivative value is a good approximation to the optimal solution.

Bit Allocation Strategy

In order to evaluate the rate allocation strategy as described above, the following ancillary models are provided. The number of multiple transcoding components is N, with component i operating at bit rate $R_i$ and a distortion $D_i$. The total distortion is given by $D = \Sigma_{i=1}^N D_i(R_i)$, and a total rate is given by $\Sigma_{i=1}^N R_i$. We assume that all R-D functions are convex, and $dD_i/dR_i \leq 0$, for all $i = 1, \ldots, N$.

In one interpretation of the problem, we are given an additional rate $\Delta R \geq 0$. The goal is to allocate among the components so that the total distortion D is maximally decreased. If $\Delta R$ is relatively small, then the total change in distortion, $\Delta D$, can be expressed as:

$$\Delta D = \sum_{i=1}^N \left( \frac{dD_i}{dR_i} \cdot \Delta R_i \right) \geq \frac{dD_k}{dR_k} \cdot \sum_{i=1}^N \Delta R_i = \frac{dD_k}{dR_k} \cdot \Delta R, \text{ where} \qquad (22)$$

$$\left| \frac{dD_k}{dR_k} \right| \geq \left| \frac{dD_i}{dR_i} \right| \text{ and } \frac{dD_i}{dR_i} \leq 0 \; \forall \; i = 1, \ldots, N.$$

In the above equation, the derivative $dD_i/dR_i$ is replaced by the highest absolute value of derivative $dD_k/dR_k$, because $dD_i/dR_i \leq 0$. Therefore, the allocation scheme that best minimizes $\Delta D$, or maximizes $|\Delta D|$, because $\Delta D < 0$, allocates all the additional bits to component k.

In a second interpretation of the problem, we decrease the total rate R by $\Delta R$. In this case, $\Delta D$ can be expressed as:

$$\Delta D = \sum_{i=1}^N \left( \frac{dD_i}{dR_i} \cdot \Delta R_i \right) \geq \frac{dD_l}{dR_l} \cdot \sum_{i=1}^N \Delta R_i = \frac{dD_l}{dR_l} \cdot \Delta R, \text{ where} \qquad (23)$$

$$\left| \frac{dD_l}{dR_l} \right| \leq \left| \frac{dD_i}{dR_i} \right| \text{ and } \frac{dD_i}{dR_i} \leq 0 \; \forall \; i = 1, \ldots, N.$$

In the above equation, the derivative $dD_i/dR_i$ is replaced by the lowest absolute value of derivative $dD_l/dR_l$. Therefore, the best bit allocation scheme that minimizes $\Delta D$, decreases the rate of component l by $\Delta R$.

In a third interpretation of the problem, we reallocate bits among the transcoding components without increasing or decreasing the total rate. To achieve this, we increase the rate of some components. We denote this group with current operation rate $R_{ik}$ and distortion $D_{ik}$, wherer ik $\in [1, N]$. We also decrease the rate of the remaining components. We denote this group with current operation rate $R_{il}$, and distortion $D_{il}$, where il $\in [1, N]$). The rate increase $\Delta R_{ik}$ and the rate decrease $\Delta R_{il}$ should satisfy the three conditions below:

(i) $\sum_{\Delta R_{ik} \geq 0} \Delta R_{ik} = \Delta R,$ \qquad (24)

(ii) $\sum_{\Delta R_{il} \leq 0} \Delta R_{il} = -\Delta R,$ (iii) $\Delta R > 0,$ where $\Delta R$ is the total rate adjustment. Then, the total change in distortion can be expressed as:

$$\Delta D = \sum_{\Delta R_{ik} \geq 0} \frac{dD_{ik}}{dR_{ik}} \cdot \Delta R_{ik} + \sum_{\Delta R_{il} \leq 0} \frac{dD_{il}}{dR_{il}} \cdot \Delta R_{il} \geq \qquad (25)$$

$$\frac{dD_k}{dR_k} \sum_{\Delta R_{ik} \geq 0} \Delta R_{ik} + \frac{dD_l}{dR_l} \sum_{\Delta R_{il} \leq 0} \Delta R_{il}$$

$$= \frac{dD_k}{dR_k} \cdot \Delta R - \frac{dD_l}{dR_l} \cdot \Delta R,$$

where $\left| \frac{dD_k}{dR_k} \right| \geq \left| \frac{dD_{ik}}{dR_{ik}} \right|, k \in \{ik\},$ and $\left| \frac{dD_l}{dR_l} \right| \leq \frac{dD_{il}}{dR_{il}}, l \in \{il\}.$ From the above equation, it can be seen that the optimal bit reallocation scheme to minimize distortion should be the one that deducts $\Delta R$ only from the component with the smallest absolute derivative value, and adds ΔR only to the component with the largest absolute derivative value.

An additional point that needs to be addressed here is the optimal value of ΔR. Because the value order of the derivatives $dD_i/dR_i$ for i=1, . . . , N should not change, we select the largest possible value that keeps Eqs. (22), (23) and (25) valid.

This method has a lower cost than the global optimal method. The entire R-D curve for each encoding component is not required. In this embodiment, two local sample points on the R-D curve can be used to perform a discrete differentiation.

Sub-Optimal Bit Allocation Procedure

The following procedures are implemented to facilitate a low-complexity transcoding operation. For the first GOP of the video sequence, the model parameters are estimated and the R-D models for the video source requantization, resynchronization marker insertion and intra-refresh are established.

Then, optimal bit allocation can be achieved for this GOP through Lagrangian optimization process as described above. For each subsequent GOP, simplified parameter estimation procedures are used to generate two local operation points. Then, a local derivative is obtained by discrete differentiation. If local derivatives of the three R-D curves are equal, then the current bit allocation is retained. Otherwise, the bit allocation of the component with the largest absolute value local derivative is increased, and decrease the bit allocation of the component with the lowest absolute value local derivative.

EFFECT OF THE INVENTION

The invention provides rate-distortion D models that consider inter-frame dependency for optimal bit allocation in error resilient video transcoding. A sub-optimal scheme achieves similar performance with much lower complexity. Overall, the method according to the invention with variable bit allocation has superior performance compared to error-resilient transcoding schemes with fixed bit allocation.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for transcoding a video, comprising:
modeling a requantization of an input video as a first rate-distortion function of an input video;
modeling a resynchronization marker insertion rate as a second rate-distortion function of the input video;
modeling an intra-block insertion as a third rate-distortion function of the input video; and
transcoding the input video according to the first, second and third rate-distortion functions to produce an output video, in which the input video has a first bit rate greater than a second bit rate of the output video, and a distortion D is expressed as $$D = \left[\prod_{i=0}^{L-1} \Phi(\omega_i)\right]^{1/L} \cdot e^{-\beta \cdot R(D)},$$

where L is a total number of frequency coefficients of a discrete cosine transform in the input video, $\Phi(\omega_i)$ is a power spectrum density function of coefficient i, R is the second bit rate, and β is 21n2.

2. The method of claim 1, further comprising:
allocating bits of the input video to the output video according to the first, second, and third rate-distortion models.

3. The method of claim 1, in which the first rate-distortion function outputs a quantization parameter, the second rate-distortion function outputs the resynchronization marker insertion rate, and the third rate-distortion function outputs the intra-block insertion rate.

4. The method of claim 1, in which inter-frame dependencies in the output video are due to a requantization distortion in a current frame of the output video that is propagated to a next frame of the output video through motion compensation, and further comprising:
modifying the first rate-distortion model for the next frame to account for propagating the requantization distortion.

5. The method of claim 2, in which β is a variable, R(D) is replaced by $R^\gamma(D)$, where γ is a Lagrange multiplier, and $[\prod_{i=0}^{L-1}\Phi(\omega_i)]^{1/L}$ is replaced by a variance $\sigma^2$, so that the distortion is $$D = \sigma^2 e^{-\beta R^\gamma(D)}.$$

6. The method of claim 5, in which β is in a range of [1, 10], and γ is in a range of [0, 1], so that the distortion is $$D_0 = \sigma_0^2 e^{-\beta_0 R_0^{\gamma_0}},$$

where $D_0$ is a distortion of an intra-coded frame of the output video caused by the requantization, and $R_0$ is the first bit rate.

7. The method of claim 6, further comprising:
estimating β and γ from two sample points on the first, second and third rate-distortion functions.

8. The method of claim 6, in which the allocating operates on groups-of-frames of the output video to account for inter-frame dependencies in the input video due to a requantization distortion in a current frame of the output video that is propagated to a next frame of the output video through motion compensation, and further comprising:
changing the variance $\sigma^2_k$ to $\sigma^{*2}_k$ to model the inter-frame dependency, in which a distortion of requantized inter-frames is $$D_k = \sigma^{*2}_k e^{-\beta_k R_k^\gamma} = (\sigma_k^2 + \alpha_k D_{k-1}) e^{-\beta_k R_k^\gamma}, k=1, 2, \ldots, N-1,$$

where $\sigma^{*2}_k = \sigma^2_k + \alpha_k D_{k-1}$, and $D_{k-1}$ denotes a quantization residue error produced when a previous frame of the input video is requantized with a larger quantization-scale, $\alpha_k$ denotes a propagation ratio, which is determined by an amount of motion compensation, $\alpha_k D_{k-1}$ models the inter-frame dependency between the current and the previous frame, and N is a total number of frames in a group-of-frames.

9. The method of claim 2, in which the bits allocated for inserting the resynchronization markers are determined from a number of bits in a resynchronization header and a resynchronization marker spacing, and the bits allocated for inserting the intra-blocks are determined from the intra-block insertion rate and an average rate increase by replacing inter-coded block with intra-blocks.

* * * * *